(12) United States Patent
Ylitalo

(10) Patent No.: US 6,956,892 B2
(45) Date of Patent: Oct. 18, 2005

(54) RECEIVER

(75) Inventor: Juha Ylitalo, Oulu (FI)

(73) Assignee: Nokia Network Oy, Espoo (FI)

( * ) Notice: Subject to any disclaimer, the term of this patent is extended or adjusted under 35 U.S.C. 154(b) by 838 days.

(21) Appl. No.: 09/878,861

(22) Filed: Jun. 11, 2001

(65) Prior Publication Data

US 2002/0034270 A1 Mar. 21, 2002

Related U.S. Application Data

(63) Continuation of application No. PCT/EP98/08221, filed on Dec. 15, 1998.

(51) Int. Cl.[7] .............................................. H04L 27/30
(52) U.S. Cl. ........................ 375/144; 375/148; 375/267; 375/349; 375/350; 370/335; 370/342; 370/441; 455/52.3; 455/65; 455/296
(58) Field of Search ................................ 375/142–144, 375/147, 146, 150, 152, 260, 267, 343, 346, 347, 349, 350, 148; 370/335, 342, 320, 441, 479; 455/52.3, 65, 296

(56) References Cited

U.S. PATENT DOCUMENTS 5,629,929 A   5/1997  Blanchard et al.
6,232,927 B1 * 5/2001  Inoue et al. ................. 343/844
6,249,251 B1 * 6/2001  Chang et al. ................ 342/378
6,466,565 B1 * 10/2002 Wax et al. ................... 370/342

FOREIGN PATENT DOCUMENTS

| EP | 0749215 A2 | 12/1996 |
| EP | 0849888 A2 | 6/1998 |
| WO | WO 95/34997 | 12/1995 |
| WO | WO 95/37970 | 11/1996 |

OTHER PUBLICATIONS

International Search Report for PCT/EP98/08221.

* cited by examiner

*Primary Examiner*—Dac V. Ha
(74) *Attorney, Agent, or Firm*—Squire, Sanders & Dempsey LLP

(57) ABSTRACT

A receiver receives signals which are at least partially known and which have followed a plurality of different paths to said receiver. The receiver has an arrangement for dividing the area of coverage of said receiver into a plurality of sections. A plurality of receiving units are provided to process a different one of said signals to identify the at least partially known part of said signal. A controller is coupled to the output of said dividing arrangement for selecting the signals which are to be allocated to the respective receiving units and an interference removing arrangement is coupled to the output of the receiver units to remove interference.

34 Claims, 2 Drawing Sheets

RECEIVER

This application is a continuation of international application serial number PCT/EP98/08221, filed 15 Dec. 1998.

The present invention relates to a receiver and in particular but not exclusively to a spread spectrum receiver for use in a wireless cellular telecommunications network.

In wireless cellular telecommunication networks, the area covered by the network is divided into cells or cell sectors. Each cell or cell sector is provided with a base transceiver station (BTS) which transmits signals to and receives signals from terminals located in the cell or cell sector associated with the respective base transceiver station. The terminals may be mobile stations.

In known code division multiple access (CDMA) receivers, it is usual to provide means for code acquisition, code synchronisation and tracking and channel estimation. In CDMA systems, desired signals intended for a given receiver are identified by an allocated spreading code applied to that signal. When the received signal is despread with the allocated code, the desired signal is generally much stronger than the signals intended for other receivers and can be distinguished from the unwanted signals. In particular, the signals intended for other receivers will appear as noise. However in high capacity situations, there may be a low desired signal to noise (caused by the signals intended for other receivers) ratio. This makes the tasks of code acquisition, code synchronisation and tracking and channel estimation much harder as it is more difficult to distinguish the desired signal, even after despreading, from the noise.

It has been proposed to reduce this problem by using directional antenna arrays which are able to determine the beam directions from which a desired signal is received. These arrays are sometimes referred to as adaptive antenna arrays. It is generally assumed that in the case of a low bit (eg, speech) user, the number of co-channel users (that is the other users who are transmitting signals in the same frequency range as the desired signal but with different spreading codes) is so high that the distribution of interfering terminals is uniform. In particular, it is assumed that the angular distribution of terminals in a cell or cell sector covered by a base transceiver station is uniform. Thus the interference between the desired signal and the interfering signals is assumed to be white over the entire cell or cell sector and over time. In other words, the interference and noise is assumed to be both spatially and temporally white. This means that the noise is uniform throughout the cell or cell sector.

If the assumption that the noise is white is correct, then a simple beam forming approach would improve the noise to signal ratio. For example a simple beamformer such as a Butler matrix could be used. The direction(s) from which a desired signal is received would be identified and the signals only from that identified direction would be considered. As the number of signals from co-channel users which are received by a receiver with the desired signal would be reduced, the desired signal to noise ratio increases. In other words the signals which are received by a base station from terminals which are not from the same direction as the desired signal do not contribute to the noise. This means that the number of other users contributing to the noise for a given received signal would be reduced and the signal to noise ratio increased.

However, the assumption that the noise is always white throughout the cell or cell sector is not always true. In other words it cannot be assumed that the users are uniformly distributed throughout a cell or cell sector. For example, there may be hot spots (where a large number of user are simultaneously using the system), directions from which a large amount of interference comes such as office buildings or airports or high power users which require a high data rate. These factors can give rise to strong interference in a particular direction. Thus, any of these factors can give rise to interference which will be referred to hereinafter as "colored" interference. In other words the interference is no longer uniform across the cell or cell sector or over time.

If the noise is not white, then problems can arise if the terminal which provides the desired signal is received by the base transceiver station from the same direction from which strong interference is received. If the desired signal to noise ratio is low in the direction from which the desired signal is received because of this, then code acquisition and code synchronisation can be difficult. This means that the information carried by the desired signals may not be obtained or may be corrupted. Another problem which arises is that the capacity of the system may be reduced. This is because the interfering terminals interfere with the desired signal to such an extent that the desired signal cannot be separated from the interfering signals. According a connection cannot be established with the terminal providing the desired signal. When a desired signal can not be separated from the unwanted signals, the number of users may have to be reduced to the point where it is again possible to distinguish a desired signal from unwanted signals. This will reduce capacity. Thus a simple beamforming solution will not always provide the required performance.

It is an aim of certain embodiments of the present invention to provide a receiver which is able to reduce the problems described hereinbefore.

According to one aspect of the present invention, there is provided a receiver for receiving signals which are at least partially known and which have followed a plurality of different paths to said receiver, said receiver comprising an arrangement for dividing the area of coverage of said receiver into a plurality of sections; a plurality of receiving units, each of said receiving units being arranged to process a different one of said signals to identify said at least partially known part of said signal; a controller coupled to the output of said dividing arrangement for selecting the signals which are to be allocated to the respective receiving units; and an interference removing arrangement coupled to the output of said receiver units to remove interference.

Thus, the effects of interference can be removed.

The dividing arrangement preferably comprises a beamformer. This beamformer may be in the form of a Butler matrix or may be any other suitable type of beamformer. The beamformer may be an orthogonal beamformer.

The interference removing arrangement is preferably arranged to filter out colored interference. In other words, the effects of, for example, hot spots and the like can be removed.

The interference removing arrangement may comprise a plurality of interference removing units with a interference removing unit being coupled to the output of each of the receiving units. By having a interference removing unit for each of the receiving units, the potentially different effects of the interference in each of the receiving units can be suppressed separately. Each interference removing unit preferably uses signal information from a plurality of different sections. In a preferred embodiment, each receiving unit may be arranged to use signal information from three different sections. Each receiving unit may be arranged to consider the signal information from the section from which the signal allocated to the associated receiving unit has been received and the adjacent sections on either side thereof. In a colored interference situation, the interference in each of these sections is likely to be different. By considering the information from each of the sections, it is possible to cancel tile effects of the non-uniformity of the interference.

A combiner is preferably provided for combining the output of the interference removing units to provide a single signal.

Each of the receiving units is preferably arranged to determine values which are used by said interference removing arrangement in the processing of signals. Each of the receiving units may be arranged to calculate the channel impulse response of the allocated signal from said given one of the sections. More preferably, each of the receiving units is arranged to calculate the channel impulse response of the allocated signal from said given one of the sections and from the adjacent sections on either side thereof. An average of the channel impulse response may be used.

Each of the receiving units may be arranged to calculate the difference between the desired signal and the received signal. The difference between the desired signal and the received signal represents the noise and/or interference. Each of the receiving units may be arranged to calculate the difference between the desired signal and the received signal for the given one of the sections from which the allocated signal is received and the adjacent sections on either side thereof to define a vector q. An average of the difference in said signals may be used. A matrix Q may be defined by $q.q^H$ where $q^H$ is the vector q transposed and the values thereof replaced by complex conjugates.

Each of the interference removing units preferably is arranged to receive the channel impulse response values and the matrix Q from the respective receiving unit. Alternatively, each interference removing unit may receive an average of said matrices. A weighting may be determined from the matrix and the channel impulse response values, said weighting being applied to said signal. The weighting may be applied to the signal from the allocated section as well as the signals from the adjacent sections on either side thereof. The weighting may be defined by: ((the inverse of said matrix Q)×(the channel impulse response values))$^H$, where H means that the inverse and complex conjugates are taken.

Each of said interference removing units may apply weighting to the received signal from at least the section allocated to the associated receiving unit, whereby the effects of interference are cancelled. The weighting applied to the signals is preferably such that the effects of the colored interference are cancelled by appropriately weighting the signals from different sections and adding the results together to define a single signal. This single signal may be output to the combiner.

The controller may comprise means for determining the presence of the signals in each of the sections. The determining means may be arranged to determine the strength of the signals. The determining means may comprise a plurality of separate units, each being arranged to process signals from a respective one of the sections. By determining the strength of the signals, it is possible to allow a decision to be made as to which signals are to be allocated to which receiving unit.

The plurality of receiving units may define a rake receiver. The signals may be in the form of the code division multiple access format. The receiver may be incorporated in a base station or a mobile station. The known part of the signal may be pilot symbols or any other suitable reference. The receiving unit may correlate the known part of the signal (eg, the pilot symbols) with the allocated signal.

For a better understanding of the present invention and as to how the same may be carried into effect, reference will now be made by way of example only to the accompanying drawings in which.

Figure 3:
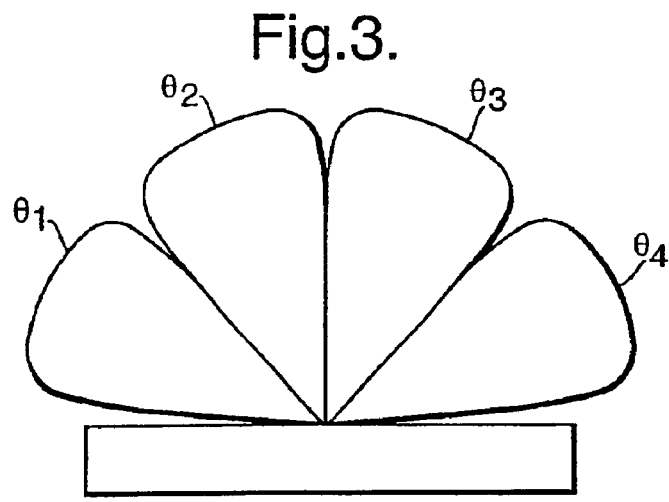
Figure 4:
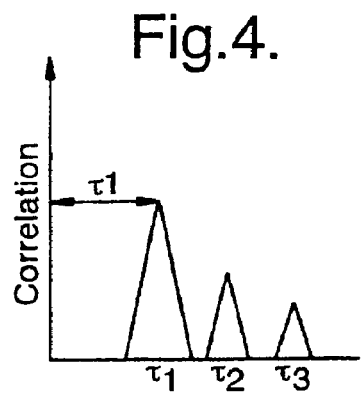
Figure 2:
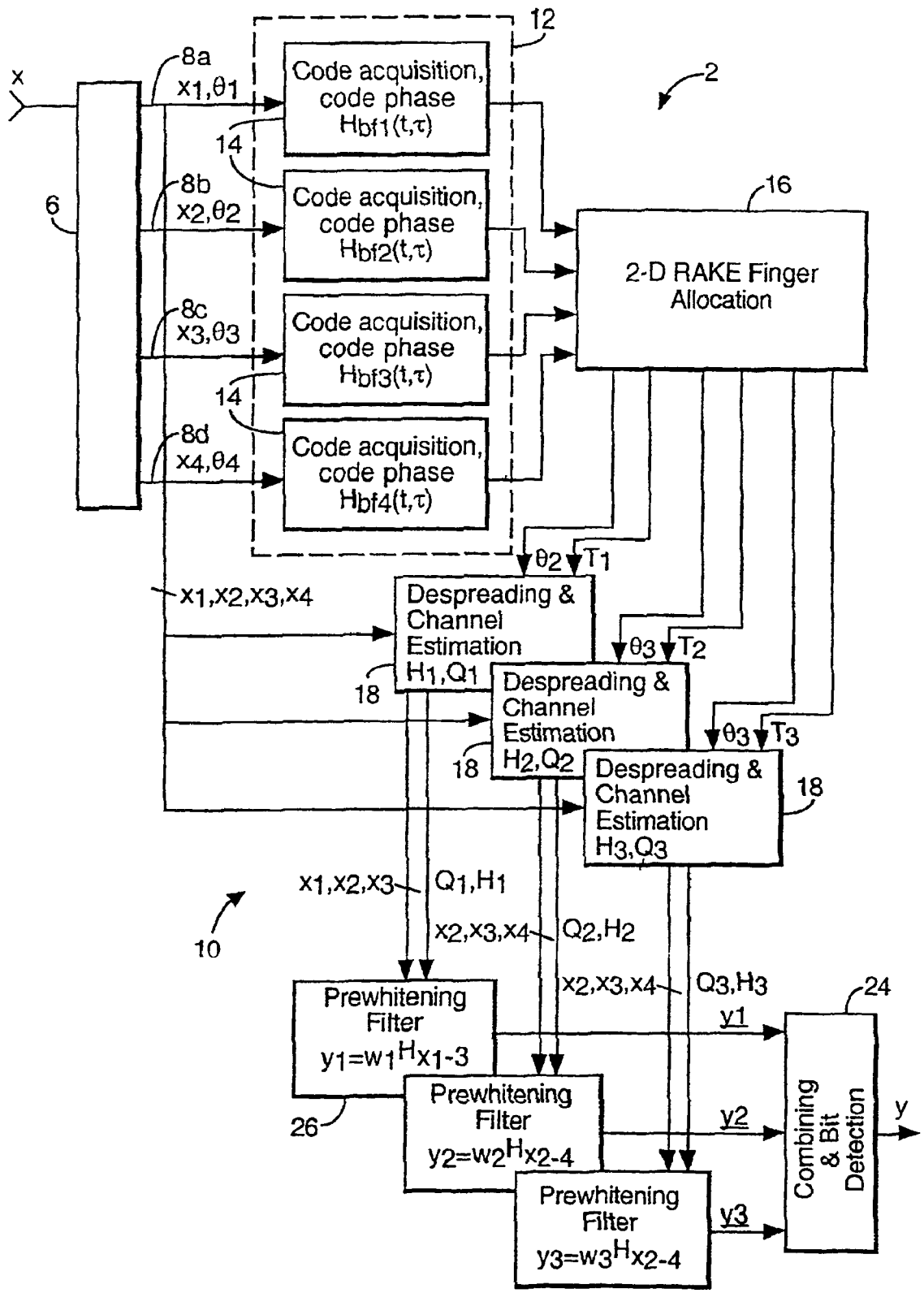
FIG. 2 shows a schematic diagram of part of the receiving part of a base transceiver station.

FIG. 3 schematically shows the different beam directions from which a signal may be received; and FIG. 4 shows the results of the correlation carried out by the one code block of FIG. 2.

Figure 1:
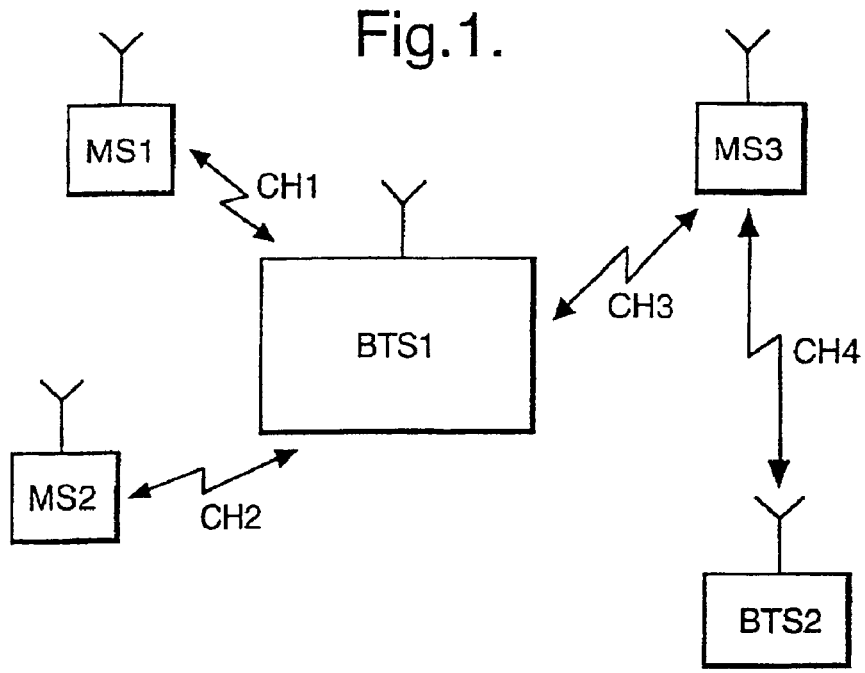
FIG. 1 shows a block diagram of a mobile communication system.

Reference will first be made to FIG. 1 which shows a block diagram illustrating a context in which the present application may be used. That is, the CDMA wireless cellular telecommunications network allows a plurality of mobile stations MS 1, MS 2, MS 3 to communicate with a base transceiver station BTS 1 in the common cell via respective channels CH 1, CH 2, CH 3. The base transceiver station BTS 1 is arranged, as will be described in more detail hereinafter to determine the direction in which signals from the respective mobile stations MS 1, MS 2 MS 3 are received.

When a signal is transmitted from a base transceiver station to a mobile station or vice versa, the signal will follow a number of different paths (multipaths) due to reflection of the signals from buildings or the like. Thus, the same signal will arrive at its destination mobile station or base station at different times depending on the length of the path travelled.

Reference will now be made to FIG. 2 which shows a schematic view of the receiving part 2 of the base transceiver station BTS 1. The received signal x is input into a beamformer 6 which provides four beam forming signals, each for a different direction. The four beams are orthogonal. Each of the signals is from a different part of a cell sector, as illustrated diagrammatically in FIG. 3. Angles θ1–θ4 represent the angle of the central point of each direction. In the example shown in FIG. 3, the 180° of the cell sector is divided into four directions each direction covering 180/4= 45° of the sector. θ1 is thus at 22.5°, θ2 is at 67.5°, θ3 is at 112.5° and θ4 is at 157.5°. Thus the first direction is the beam including angle θ1, the second direction is the beam including angle θ2 and so on. In practice, there will be some overlap of the directions so that each direction in fact covers more than 45° of the sector.

For convenience, the part of the signal received from the direction including the angle θ1 is referenced x1, the part of the signal from the direction including θ2 is referenced x2, the part of the signal received from the direction including the angle θ3 is referenced x3 and the part of the signal from the direction including θ4 is referenced x4. The signals received by the beamformer are coherently combined to provide x1, x2, x3 and $x_4$ as is known.

As mentioned hereinbefore a single signal transmitted by a mobile station will follow more than one path to the base transceiver station due to multipath effects such as reflection. These multipath signals may be received by the base transceiver station at different times and from different directions. Thus, for example two versions of a signal could be received by the base transceiver station from the same direction but at different times. Likewise, the same signal can be received from more than one direction. The different versions of the same signal will have different strengths. To deal with the multipath effects, a RAKE or diversity receiver 10 is used. The RAKE receiver 10 coherently combines the various versions of the same signal which have followed different paths to the base station.

The RAKE receiver 10 includes a sounding block 12 which includes a code-matched filter. The function of the sounding block 12, which is sometimes referred to as a searcher, is to ascertain when each multipath propagation reaches the base station from a given mobile station and the strength of each of these multipath signals. The sounding block 12 comprises four code acquisition and code phase blocks 14 (hereinafter referred to as code blocks). Each code block 14 is connected to an output 8a–d of the beamformer 6, each output corresponding to a different direction.

Each code block 14 will correlate the received signal from the respective output 8a–d of from one of the beamformers 6 with the spreading code corresponding to that used by a given terminal in respective time slots t and with a variety of delays τ within each time slot. For example in a CDMA system, the pilot spreaded symbols of a known pilot sequence are correlated with the received signal which also includes that same pilot sequence. The result of that correlation is an impulse response vector h(t,τ) for each time slot t. The elements of the vector represent the different delays τ in the time slot t.

Thus the signal x1 is input to the first code block 14, signal x2 to the second code block and so on. The results of a typical sounding correlation carried out by one of the code blocks 14 are shown in FIG. 4. Each of the peaks represents the channel impulse response for that multipath. The size of the peak represents the strength of the signal and its relative position to its relative delay.

The three correlations shown in FIG. 4 represent the same signal from a given mobile station which has followed three different paths to the base station and which have been received in a given time slot t. It should be noted that all three of these paths are such that the signal appears to come from the same beam direction. The same signal may sometimes appear to come from more than one beam direction depending on the radio environment.

As can be seen from FIG. 4, the first correlation is obtained when the code is delayed with respect to the received signal by relative delay τ1. The next two correlations, which are decreasing in size, are obtained when the relative delays are τ2 and τ3 respectively. The first correlation peak corresponds to the strongest multipath signal received from a given mobile station from a given one of the beam directions with the second and third correlation peaks corresponding to the two weaker multipath propagations of the same signal. All three of these multipaths have been received from the same direction. The correlations obtained from multipaths from different directions will be obtained by other code blocks 14 processing signals from those other directions.

The output of each of the code blocks 14 is input to a controller 16 which determines the allocation of the fingers 18 of the RAKE receiver 10. In particular, the controller 16 considers all of the correlations obtained by the four code blocks 14 using a particular pilot sequence and constructs a two dimensional spatio-temporal matrix. That matrix will include the impulse response vectors h calculated by each of the code blocks 14. The controller 16 will then select using the matrix, for example, the strongest three peaks and the multipaths corresponding to these three peaks will then be allocated one to each finger 18 of the RAKE receiver 10. The selection of the multipaths to be allocated to the respective fingers can be done using any suitable criteria.

To aid understanding of this embodiment of the present invention, it will be assumed that three strong correlations have been obtained, two will be in the direction containing the angle θ3 whilst the other will be in the direction containing angle θ2. The calculated delay for the multipath signal from the direction of angle θ2 will be τ1 whilst the delay for the two multipath signals from the direction of angle θ3 will be τ2 and τ3 respectively. The delays are determined from the correlations as shown in FIG. 4.

The controller 16 provides two outputs to each finger 18. The first output provides information as to from which beam direction θ the allocated multipath signal has been received. The second output provides the delay T associated with the multipath signal allocated to a particular finger. (T takes into account τ and t).

Each finger despreads the signal xi allocated to the finger. Each finger 18 is also arranged to receive an input comprising three of the four signals x1–4 input to the code blocks 14. The signal xi corresponding to θi, allocated to the finger along with signals xi±1 are input to the finger. The fingers calculate H for each finger as follows for one pilot symbol.

$$H = \begin{bmatrix} Ha \\ Hb \\ Hc \end{bmatrix} = p \cdot \begin{bmatrix} x(i-1)(Ti) \\ xi(Ti) \\ x(i+1)(Ti) \end{bmatrix}$$

where Ti is the delay allocated to a particular finger, p is the pilot symbol and H is the channel impulse response vector. Thus H represents the channel impulse response at the delay of the given finger for the three beam directions x(i−1), xi and x(i+1). In the case of the first finger, the three beam directions would be x1, x2 and x3. In practice, an average is taken over k pilot symbols p. Thus:

$$H = \frac{1}{k} \sum_{k=1}^{k} \left( pk \cdot \begin{bmatrix} x(i-1)(Ti) \\ xi(Ti) \\ x(i+1)(Ti) \end{bmatrix} \right)$$

In other words the same pilot sequence is correlated with each of the signals having a delay Ti received from the three directions in question and the results of this correlation provide a 3X1 vector. There will be a strong correlation for the xi signal with usually a weaker correlation for the x(i+1) and x(i−1) beams.

Each finger 18 is also arranged to calculate a noise interference covanance matrix Q.

Firstly a q vector is calculated as follows for one pilot symbol:

$$q = \begin{bmatrix} q(xi-1) \\ q(xi) \\ q(xi+1) \end{bmatrix} = \begin{bmatrix} x(i-1) \\ x(i) \\ x(i+1) \end{bmatrix} - \begin{bmatrix} Ha \cdot p \\ Hb \cdot p \\ Hc \cdot p \end{bmatrix}$$

x(i−1), xi, x(i+1) represents the signals received from the three directions of interest, Ha, Hb and Hc represents the channel impulse response calculated by the respective finger and p is again the pilot symbol. Ha.p, Hb.p and Hc.p represents the desired signal from each of the three respective directions (without interference). q is thus the difference between the received and desired signals and represents therefore the noise and interference for each of the three directions.

Again, an average is taken over to pilot symbols so that:

$$q = \frac{1}{k}\left(\sum_{k=1}^{k}\left(\begin{bmatrix}x(i-1)\\xi\\x(i+1)\end{bmatrix} - \begin{bmatrix}Ha\\Hb\\Hc\end{bmatrix}\cdot pk\right)\right)$$

To obtain the Q matrix, the following calculation is performed.

The matrix Q is defined by $q.q^H$ $q^H$ is the transpose of a which contains the complex conjugate of the values of q. $q^H$ is thus a Hermitian transpose of q vector. Q is thus a three by three matrix and is averaged over k and can be represented as follows:

$$Q = (1/k)\sum_{k=1}\left[\begin{bmatrix}x(i-1)\\x(i)\\x(i+1)\end{bmatrix} - Hp\ k\right]\left[\begin{bmatrix}x(xi-1)\\x(i)\\x(i+1)\end{bmatrix} - H\ pk\right]^H$$

where pk is the kth pilot symbol. H pk) represents the desired signal.

The noise and interference covariance matrix Q determined by each finger is output to a respective pre-whitening filter 26 along with the channel impulse response vector H. The impulse response H and Q matrix allow the effects of colored interference to be compensated.

Each pre-whitening filter can be regarded as a beamformer and may be regarded as a colored interference suppressing beamformer. If the finger associated with a given filter 26 is associated with the signals xi, then the pre-whitening filter will receive the following three signals from the output of the associated finger: x(i−1), xi and x(i+1). Thus with the finger allocated to the multipath signal from the direction including angle θ2, which corresponds to x2, the filter 26 will receive signals x1, x2 and x3. Likewise with the other two fingers which are allocated to signals from the direction including angle θ3, the associated filters will receive signals x2, x3 and x4.

The pre-whitening filter uses the Q matrix to ensure that the noise component and interference is removed from the signals using a suitable weighting factor. The weighting factor Wi for each filter is: Wi=$Q^{-1}$.Hi where $Q^{-1}$ is the inverse of the Q matrix and Hi is as calculated by the associated finger as discussed hereinbefore. Wi is thus a 3×1 vector.

The output yi of each prewhitening filter is defined by:

$$yi = Wi^H \begin{bmatrix}x(i-1)\\xi\\x(i+1)\end{bmatrix}$$

where $Wi^H$ is the transpose of Wi which contains the complex conjugate of the values of Wi. $Wi^H$ is a Hermitian vector. The effects of these calculations is that the interfering signals in each of the three directions are added together so that the resulting interference component of the received signal is suppressed. The desired signal from each of the three directions are coherently combined to provide a single output yi. In practice, the desired signal will be received from each of the three beam directions x(i−1), xi and x(i+1) at delay T although the signal may be weaker in the x(i−1) and x(i+1) directions.

It should be appreciated that in practice any suitable beamformer can be used such as Wiener-Hopf beam former of a MMSE (minimum mean square error) beam former or the like.

As a pre-whitening filter 26 is provided for each RAKE finger, independent colored noise compensation can be independently provided with a delay resolution of one chip interval or the equivalent.

The output yi of each of the pre-whitening filter is output to the combiner 24. The combiner 24 coherently combines the signals output by the three pre-whitening filters 26 to provide a single signal. To ensure that the signals are in phase when combined, the combiner 24 may delay one or more of the signals with respect to the other of the signals. However, in some embodiments, the combiner may just sum the signals. After the signals have been combined, bit detection takes place. In other words, the combined signal is processed to extract the information carried thereby.

In another modification, the matrices calculated by each of the fingers are averaged to provide an averaged matrix Q which is input to each of the prewhitening filters.

In one modification to the embodiment described hereinbefore, the estimates of the channel impulse response h(t,τ) determined by each of the code blocks 14 can also be used by the channel estimation blocks 18. These channel estimates are then used to estimate the Q matrix and the H vector. In the embodiment described hereinbefore, the channel estimation blocks separately calculated the channel impulse response estimates.

In one modification to the embodiment shown in FIG. 2, the fingers 18 are arranged to output the respective channel estimation vectors H to the combiner 24 which uses these estimates in the bit detection process.

The beamforming can be done using an analogue beamformer such as a Butler matrix or a digital beamformer.

The fingers could all be allocated to the same direction or to one or more different directions.

When the pre-whitening filter is dealing with one of the end directions such as x1 or x4, information from an adjacent cell or cell sector may be used. This is particularly easy to implement with cell sectors which share a common base station location so that the necessary information can be shared by base stations serving adjacent cell sectors.

The advantages which may be achieved by embodiments of the present invention will now be summarised:

The initial beamforming provided by the beamformer 6 enhances the desired signal with respect to the interfering signals. This is because the number of interfering signals is reduced because signals from only part of the cell or cell sector is received by the respective beam former. This beamforming reduces the effects of white noise.

Additional beamformers in the form of the pre-whitening filters 26 are provided with one pre-whitening filter being provided for each RAKE finger. Each pre-whitening filter 26 is independent of the others and mitigates the effects of colored interference. This mitigation of the effects of colored interference can be achieved within a chip interval as an independent pre-whitening filter may be provided for each finger.

The quality of signals and the reliability of the system, that is the network which uses receivers embodying the present invention, are improved. This is because reliable channel estimation due to the beamforming provided by the beamformer 6 takes place. The more reliable channel estimation provides an improved signal to interference noise ratio as the desired signal is coherently combined by the combiner 24 before bit detection takes place. Code acquisition and tracking and RAKE finger allocation also are more reliable as compared to known arrangements.

The capacity of the system is improved because suppression of the interfering signals by the pre-whitening filters 26 as well as by the beamformers 6 results in an improved signal to interference noise ratio. This means that more traffic can thus be supported.

The method is not complex in that the noise and interference covariance matrix Q is estimated using only the channel estimates of the desired signal. Thus the Q matrix is based on the desired signal and there is no need to estimate the channel impulse response for any of the interfering signals.

The method is well suited to CDMA mobile communications systems since each propagation path (that is each RAKE finger) can be processed independently before combining. This means that for each delay interval (sometimes referred to as a tap or chip duration) a near optimal beamforming can be achieved by the beamformer 6 and the pre-whitening filters 26.

As a result of the orthogonal beamforming carried out by the beamformer 6, a 2 dimensional spatio-temporal channel impulse response can be obtained which allows the separation of independent RAKE fingers even where the same delay is present. This is because the cell or cell sector is effectively split up by the beamformer 6 into different directions. In other words, the separation of the RAKE fingers can occur in orthogonal fashion in an angular domain.

Embodiments of the present invention may use parallel processing. For example, in some embodiments of the present invention it may be adequate to scan only the defined beam directions. This means that if a four element array is used as shown in FIG. 2, only a four fold increase in processing power is required and this processing can be accomplished in parallel as shown in the illustrated embodiment.

The described embodiment of the invention considered four directions. However, any other suitable number of directions may be considered. Likewise the described embodiment of the invention used three RAKE fingers. However any other suitable number of fingers may be provided.

Whilst the present invention has been described in the context of a base transceiver station, embodiments of the present invention may be incorporated in the terminals which are in a cell or cell sector. The terminals may be fixed or mobile terminals. In the case of mobile stations, the receiver may additionally be able to receive the same signal from two or more base stations when in a soft handoff situation.

Embodiments of the present invention have been described in the context of a CDMA system. It should be noted that embodiments of the present invention can be used with any other suitable direct sequence access system or any other suitable spread spectrum system. Embodiments of the present invention are also applicable to hybrid access systems which use spread spectrum techniques in combination with another access technique such as, for example time division multiple access (TDMA).

It should be appreciated that embodiments of the present invention may have applications other than in cellular telecommunication networks. For example embodiments of the present invention may be used in any environment making use of directional radio communication, such a PMR (private mobile radio) or the like.

What is claimed is:

1. A receiver for receiving signals which are at least partially known and which have followed a plurality of different paths to said receiver, said receiver comprising:
   an arrangement for dividing an area of coverage of said receiver into a plurality of sections;
   a plurality of receiving units, each of said plurality of receiving units being arranged to process a different one of said signals to identify the at least partially known part of said signals;
   a controller coupled to the output of the dividing arrangement for selecting the signals which are to be allocated to the respective receiving units; and
   an interference removing arrangement coupled to the output of said receiving units to remove interference based on signal information from the plurality of sections.

2. A receiver as claimed in claim 1, wherein said dividing arrangement comprises a beamformer.

3. A receiver as claimed in claim 2, wherein said beamformer provides orthogonal beams.

4. A receiver as claimed in claim 2, wherein the beamformer arrangement comprises a Butler matrix.

5. A receiver as claimed in claim 1, wherein the interference removing arrangement is arranged to filter out coloured interference.

6. A receiver as claimed in claim 1, wherein the interference removing arrangement comprise a plurality of interference removing units with an interference removing unit being coupled to the output of each of the receiving units.

7. A receiver as claimed in claim 6, wherein each interference removing unit uses signal information from a plurality of different sections.

8. A receiver as claimed in claim 6, wherein a combiner is provided for combining the output of the interference removing units to provide a single signal.

9. A receiver as claimed in claim 6, wherein each said interference removing unit applies weighting to the received signals from at least the section allocated to an associated receiving unit, whereby the effects of interference are cancelled.

10. A receiver as claimed in claim 1, wherein each receiving unit is arranged to use signal information from three different sections.

11. A receiver as claimed in claim 10, wherein each receiving unit is arranged to consider the signal information from one of the sections from which the signal allocated to the associated receiving unit has been received, and adjacent sections on either side thereof.

12. A receiver as claimed in claim 1, wherein each of the receiving units is arranged to determine values which are used by said interference removing arrangement.

13. A receiver as claimed in claim 12, wherein each of said receiving units is arranged to calculate a channel impulse response of the allocated signal from a given one of the sections.

14. A receiver as claimed in claim 13, wherein each of said receiving units is arranged to calculate the channel impulse response of said allocated signal from said given one of the sections and from adjacent sections on either side thereof.

15. A receiver as claimed in claim 14, wherein each of said receiving units is arranged to calculate a difference between a desired signal and the received signals for the given one of the sections from which the allocated signal is received and the adjacent sections on either side thereof to define a vector q.

16. A receiver as claimed in claim 14, wherein each of said interference removing units is arranged to receive a channel impulse response of the allocated signal from a given one of the sections and a matrix from the respective receiving unit.

17. A receiver as claimed in claim 13, wherein each of said receiving units is arranged to calculate an average channel impulse response.

18. A receiver as claimed in claim 12, wherein each of said receiving units is arranged to calculate a difference between a desired signal and the received signals.

19. A receiver as claimed in claim 18, wherein each of said receiving units is arranged to calculate an average difference between said desired and received signals.

20. A receiver as claimed in claim 19, wherein a matrix is defined by $q \cdot q^H$ where $q^H$ is the vector q transposed and the values thereof replaced by complex conjugates.

21. A receiver as claimed in claim 20, wherein each said interference removing unit is arranged to receive an average of the matrices of said receiving units and channel impulse response values.

22. A receiver as claimed in claim 21, wherein a weighting is determined from said matrix and said channel impulse response values, said weighting being applied to said signals.

23. A receiver as claimed in claim 22, wherein said weighting is applied to said signals from the allocated section and the signals from the adjacent sections on either side thereof.

24. A receiver as claimed in claim 22, wherein said weighting is defined by:

((the inverse of said matrix)×(the channel impulse response values))$^H$, where H means that the inverse and complex conjugates are taken.

25. A receiver as claimed in claim 1, wherein the controller comprises means for determining the presence of said signals in each of said sections.

26. A receiver as claimed in claim 25, wherein the determining means is arranged to determine the strength of the signals.

27. A receiver as claimed in claim 25, wherein the determining means comprises a plurality of separate units, each one being arranged to process signals from a respective one of said sections.

28. A receiver as claimed in claim 1 wherein the plurality of receiver units define a RAKE receiver.

29. A receiver as claimed in claim 1, wherein said signals are in the code division multiple access format.

30. A receiver as claimed in claim 1, wherein said at least partially Known part of said signals comprise at least one pilot symbol.

31. A receiver as claimed in claim 1, wherein said receiving units process said different one of said signals by correlating the signal with information on said at least partially known part thereof.

32. A base station incorporating a receiver for receiving signals which are at least partially known and which have followed a plurality of different paths to said receiver, said receiver comprising:

an arrangement for dividing an area of coverage of said receiver into a plurality of sections;

a plurality of receiving units, each of said plurality of receiving units being arranged to process a different one of said signals to identify the at least partially known part of said signals;

a controller coupled to the output of the dividing arrangement for selecting the signals which are to be allocated to the respective receiving units; and an interference removing arrangement coupled to the output of said receiving units to remove interference based on signal information from the plurality of sections.

33. A mobile station incorporating a receiver for receiving signals which are at least partially known and which have followed a plurality of different paths to said receiver, said receiver comprising:

an arrangement for dividing an area of coverage of said receiver into a plurality of sections;

a plurality of receiving units, each of said plurality of receiving units being arranged to process a different one of said signals to identify the at least partially known part of said signals;

a controller coupled to the output of the dividing arrangement for selecting the signals which are to be allocated to the respective receiving units; and an interference removing arrangement coupled to the output of said receiving units to remove interference based on signal information from the plurality of sections.

34. A method for receiving signals which are at least partially known and which have followed a plurality of different paths, the method comprising:

dividing an area of coverage of a receiver into a plurality of sections;

processing a different one of said signals to identify the at least partially known part of said signals in a plurality of receiving units;

selecting the signals which are to be allocated to the respective receiving units; and removing interference based on signal information from the plurality of different sections by an interference removing arrangement coupled to the output of the receiving units.

* * * * *